US005705307A

United States Patent [19]

Tyagi et al.

[11] Patent Number: 5,705,307

[45] Date of Patent: Jan. 6, 1998

[54] METHOD OF DEVELOPING ELECTROSTATIC IMAGES

[75] Inventors: Dinesh Tyagi, Fairport; Dennis E. Demeyer; James H. Anderson, both of Rochester, all of N.Y.

[73] Assignee: Eastman Kodak Company, Rochester, N.Y.

[21] Appl. No.: 655,585

[22] Filed: May 30, 1996

[51] Int. Cl.$^{6}$ .................... G03B 13/09

[52] U.S. Cl. .................... 430/120; 430/122

[58] Field of Search .................... 430/106.6, 108, 430/122, 120

[56] References Cited

U.S. PATENT DOCUMENTS 4,288,518 9/1981 Miyamoto .................... 430/122
4,356,245 10/1982 Hosono et al. .................... 430/122
4,546,060 10/1985 Miskinis et al. .................... 430/108

FOREIGN PATENT DOCUMENTS 0 248 119 12/1987 European Pat. Off. ........ G03G 13/09
5-8430 2/1993 Japan .................... G03G 15/09

*Primary Examiner*—John Goodrow
*Attorney, Agent, or Firm*—Norman Rushefsky

[57] ABSTRACT

A method of developing electrostatic images with a two component developer avoids the break-in period of developer by providing a fresh mixture of carrier and toner, which toner has a first particle size but replenishes the mixture in use with toner having a second particle size larger than the first particle size. This compensates for the tendency of electrostatic images to preferentially attract the larger particles in a toner mixture.

16 Claims, 2 Drawing Sheets

METHOD OF DEVELOPING ELECTROSTATIC IMAGES

This invention relates to the development of electrostatic images. More specifically, it relates to control of particle size distribution in toner in a two component developer in a method of developing electrostatic images.

Although other systems are known, the most common high speed approach to development of electrostatic images involves the application of a dry particulate toner to the electrostatic image from a two component developer which, in addition to the toner, has a magnetic carrier. The carrier is generally used to transport the toner into a toner applying condition with respect to the electrostatic image. The toner, by mixing with the carrier, develops a charge which allows it to preferentially deposit according to the image.

A well known process originally described in U.S. Pat. No. 4,546,060 to Miskinis et al suggests an electrophotographic development process using high coercivity magnetized carrier particles and a rotating magnetic core which provide extremely high quality development at very high speeds and which carrier particles do not have many of the same scumming characteristics of conventional low coercivity carrier. This process is presently commercially successful using coated carriers having very high coercivity.

All toners have some variation in particle size. Particle size, both its mean and its distribution, is an important attribute that affects aspects of the final image. Most importantly, the size of any particular toner particle affects its charge-to-mass which, in turn, affects the development of the image, as well as its transfer to a receiver.

Changes in the particle size distribution can affect the charge-to-mass of the toner that is applied to the image and, therefore, affects the ultimate image quality. Some change of this nature can be accommodated for by changing setpoints in other aspects of the image forming process, for example, by changing the development field or the electrostatic image itself. However, the need for such changes is to be avoided in designing a robust process.

Periodically, the developer needs to be changed in a high volume apparatus using this method because of a deterioration of the characteristics of the carrier. A known problem associated with this change in developer is that there is a break-in period for the new developer after which the setpoints in the apparatus must be readjusted for best results. If the ultimate setpoints are used to start, the image shows substantial mottle. If the setpoints are chosen to work well with fresh developer, the images gradually lose density as the developer is "broken in."

European Patent Application 0 248 119 to De Roo, published Dec. 9, 1987, suggests that using a low coercivity soft magnetic carrier, the apparatus will function better with a smaller particle size toner until the carrier has become well scummed. The process is started with toner having a mean particle size between 3 and 8 microns, and toner having a mean particle size between 10 and 12 microns is used in replenishment to gradually increase the size over usage as the carrier scums.

Japanese Kokoku 93-8430, published Feb. 2, 1993, suggests that soft magnetic carrier provides too conductive a developer when fresh. This is overcome by using a small particle of the toner in the developer at first to decrease conductivity and then using one at least 1.5 microns larger in replenishment. This disclosure suggests a substantial reduction in fines (particles less than 10 microns) in the replenishment toner.

SUMMARY OF THE INVENTION

In attempting to solve problems associated with the break-in period of a new developer mix, we concluded that the problem was caused by a difference in the particle size distribution of the toner in the development station and the particle size distribution of the toner in the image. More specifically, an electrostatic image has a tendency to prefer larger particles to smaller particles when presented with a choice. We believe this is due to the comparative forces holding the particles to the carrier with respect to the varying masses of the particles. Thus, if a new mixture of developer is put in the machine and images are made, the larger particles will be pulled from the mixture, leaving a different particle size distribution in the mixture with a lower mean diameter than at the beginning. Even though the toner is replenished with toner having the same particle size distribution as at the start, the mixture will gradually reduce its mean particle size until it reaches equilibrium,. Depending on the type of copy and quantity of developer in the station, this can take as long as 20,000 images. As noted above, this break-in period is noticeable in the image and requires different setpoints in the apparatus for proper imaging.

It is an object of the invention to provide a method of developing electrostatic images in which the effects of this break-in period are substantially reduced without attention to the setpoints of the apparatus.

Although the invention appears to have general application, according to a preferred embodiment, the invention is particularly usable in a system in which hard coated magnetic carrier particles are used with insulative toner in a mixture, and the mixture is moved or mixed by a rapidly rotating magnetic core in a developer applicator. This system is described in more detail in U.S. Pat. No. 4,546,060 to Miskinis et al, cited above, in which "hard" magnetic carrier is defined as carrier having a coercivity of at least 300 gauss and exhibiting an induced magnetic moment of at least 20 EMU/gm when in an applied field of 1000 gauss. Typically, much higher coercivity carrier is used; for example, carrier having a coercivity of about 2000 gauss is preferred.

This and other objects are accomplished by a method in which toner is replenished in the mixture used to develop electrostatic images by adding toner having a particle size distribution comparable to that of the toner removed in the toner applying step and having a volume weighted mean larger than the volume weighted mean of the first particle size distribution, to stabilize the particle size distribution of the toner in the mixture at the initial particle size distribution.

Using the invention, the break-in period for developer is essentially eliminated and the preferred setpoints on the apparatus can be used from the beginning without the beginning image degradation (mottle) and without either further manual adjustment or stretching any electronic adjustment that is available.

DETAILED DESCRIPTION OF THE EMBODIMENT

Figure 1:
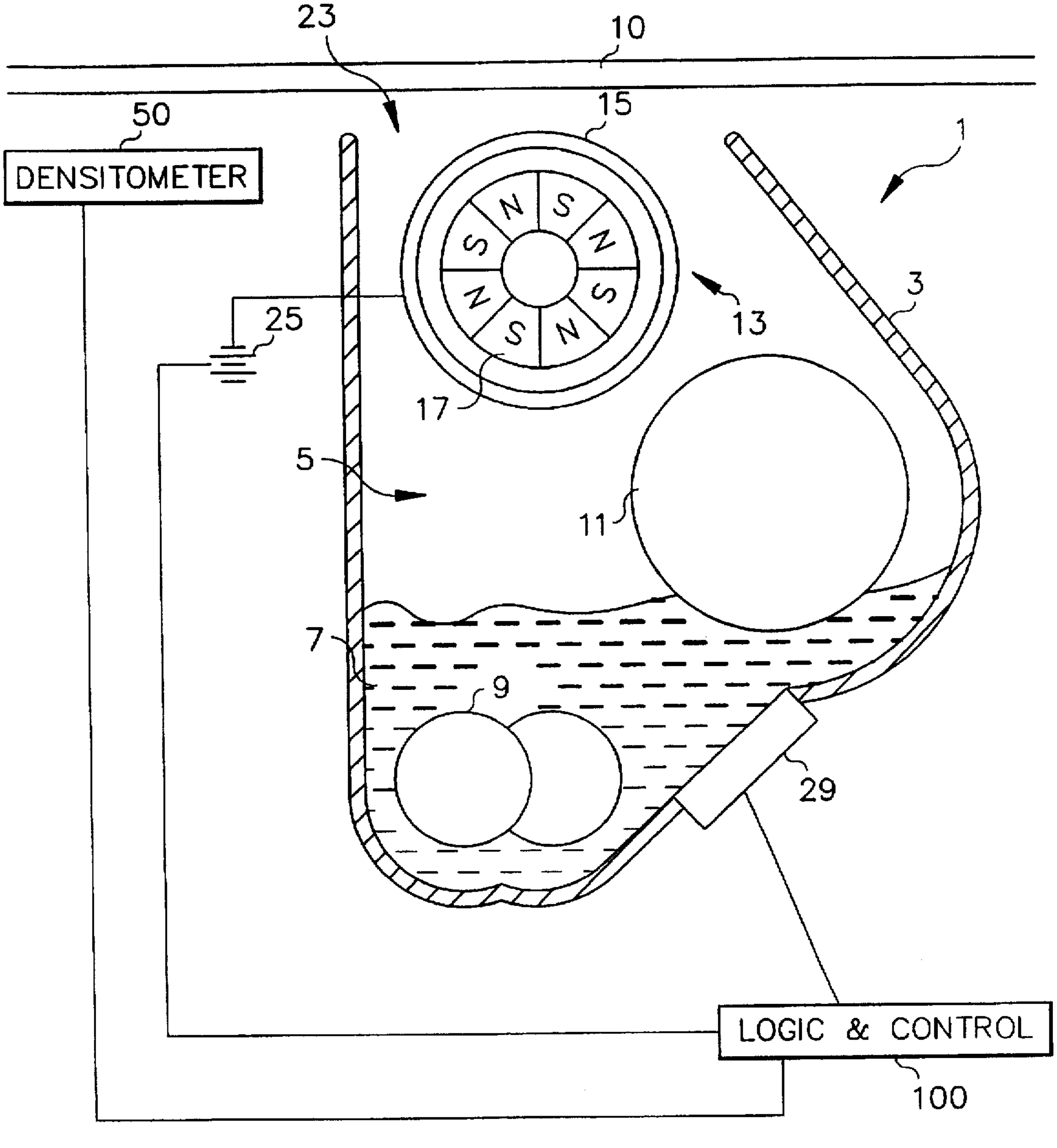
FIG. 1 is a side schematic of a toning station.

An image forming apparatus includes an image member 10, for example, a photoconductive image member, and a toning station 1. The image member 10 carries an electrostatic image on its lower surface which is to be developed by toning station 1.

Toning station 1 includes a housing 3 which defines a sump 5 which holds a mixture 7 of toner and carrier commonly called a "developer." The developer 7 is mixed by a suitable mixing device, for example, a pair of augers 9 and transported by a suitable transport device 11 to an applicator 13. The applicator 13 includes a sleeve 15 around a rotatable magnetic core 17 which can be rotated at relatively high speed, for example, from 500 to in excess of 2,000 revolutions per minute. The sleeve 15 may also be rotatable. Rotation of the sleeve and/or core moves developer held magnetically to the sleeve through a development position 23 in close developing relation with image member 10. An electrical field in the development position 23 is created by application of a bias from a potential source 25, which potential source is shown as a source of direct current, but can also include an AC component.

The carrier in the mixture 7 is preferably of high coercivity and is premagnetized to resist pole transitions created by the rotating core 17. These pole transitions cause the carrier to flip on the sleeve 13 and generally move with respect to the sleeve and rotate rapidly as the developer passes through the development zone 23. This general development process, well known in the art, provides highest quality development at very high speeds of an electrostatic image on the lower surface of image member 10.

Humidity and other changeable conditions associated with the apparatus can vary the results of the development process as well as other aspects of the image forming apparatus in which station 1 is contained. Therefore, it is common to provide some sort of process control. For example, nearly all electrophotographic copiers include some operator controls which allow an adjustment for darker or lighter images and some for other aspects, such as image contrast. These adjustments can vary a number of parameters in the apparatus, including an original charge on the image member 10, the extent of an exposure which creates the electrostatic image, the bias applied to the development station using the potential source 25 and the toner concentration as controlled by a toner monitor 29. This can also be done automatically using a logic and control 100 which can receive an input from a densitometer 50 which can measure the density of a toner image or of a specially prepared patch on the image member 10 which provides information to the logic and control that allows it to adjust these parameters.

Although adjustment for changes in characteristics affecting development can be made in most apparatus, the most robust design requires as few of such changes as possible.

Prior to this invention, changes either automatically or by hand had to be made in such image forming apparatus after a break-in period each time a new developer is loaded in to station 1. Such changing of developer is done periodically because of a "wearing out" of the carrier.

Figure 2:
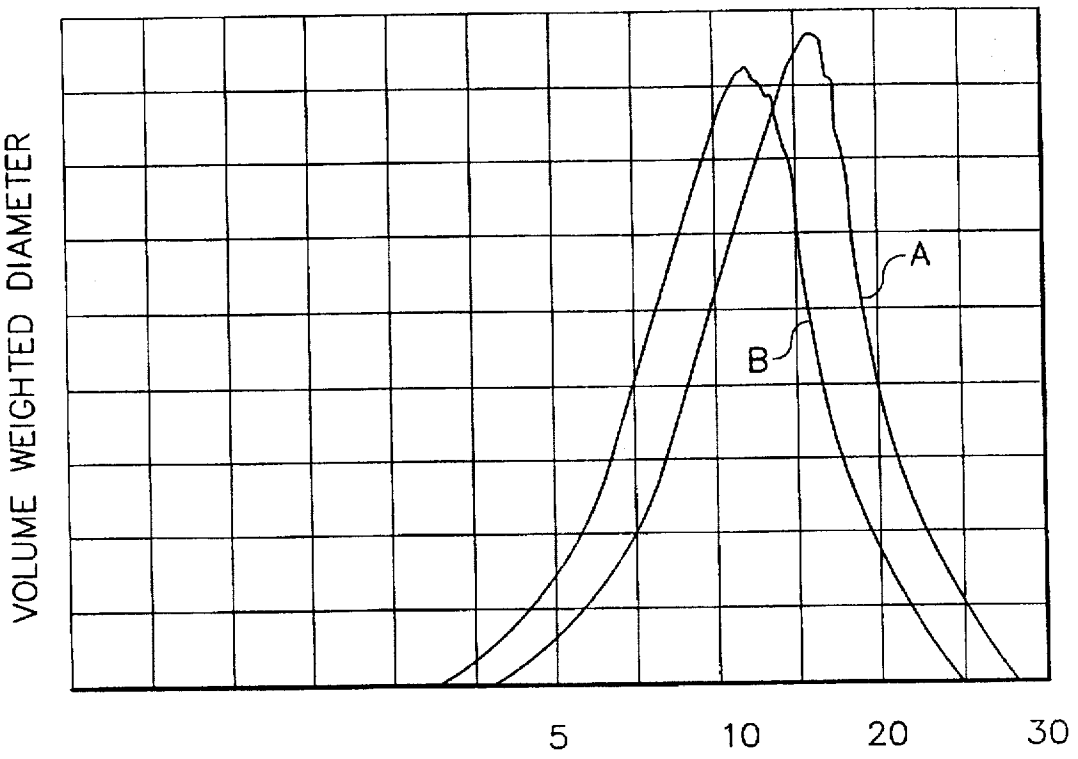
FIG. 2 is a graph of particle size distributions of two different quantities of toner.

We have found that the break-in period is due to the tendency of an electrostatic image to prefer the largest particles in a developer mix and, thus, change the particle size distribution of the mix. Referring to FIG. 2, if a developer mix having a particle size distribution characterized by curve A is initially placed in station 1 and copies are made, its particle size distribution will reduce. Even if toner is added to the apparatus in a replenishment operation, after 20,000 copies or so, the particle size distribution will have reached an equilibrium approximated by curve B.

A toning station having a particle size distribution B develops images somewhat differently than does that having a particle size distribution A with the same setpoints in the apparatus. Although the setpoints can be changed by the operator or can automatically changed by the machine, the machine is definitely more robust if such setpoint changes need not be made.

Applicants have solved this problem by starting with a developer having toner with a particle size distribution approximating that of the curve B in FIG. 2 and by replenishing the toner lost with toner having a larger average particle size distribution, for example, that of curve A.

Preferably, particle size distribution of the replenishment toner should be essentially the same as the particle size distribution of the toner deposited in the electrostatic images. With this particle size distribution in the replenishment toner, rather than the same particle size distribution that the developer started with when fresh, the particle size distribution in the mixture will stay substantially the same from the very beginning with the fresh developer.

For example, two toner mixtures were prepared using a mixture of toners comprised of styrene methyl methacrylate 2-ethyl hexyl methacrylate copolymer, styrene butylacrylate copolymer, carbon black and appropriate charge control agents. One of the toners was prepared to have a particle size distribution with a volume weighted mean between 11.5 and 12.4 microns. This first toner was mixed with a hard magnetic carrier having a strontium ferrite core having a coercivity in excess of 2000 gauss and a thennal coating of a mixture of vinylidene fluoride homopolymer and methylmethacrylate homopolymer in a ten percent by weight mixture of toner and carrier. This mixture was then placed in a development station similar to that shown in FIG. 1 and an electrostatic image was developed with it. Toner was replenished in the apparatus with a second toner of similar characteristics as the first toner but having a particle size distribution with a volume weighted mean of between 12.8 and 13.5 microns. With an initially properly adjusted machine, the copies were of high quality from the beginning and with no noticeable change over 50,000 images. This has been tried in commercial copiers extensively and the break-in period is eliminated, with a difference in volume weighted mean particle size between the start and replenishment toners of between 0.3 and 1.2 microns.

As a comparative example, the same experiment was run but starting with the second toner and replenishing with the same toner. With the apparatus set for good copies at the beginning, image quality gradually deteriorated in terms of, decreased density and a loss of resolution of some characters.

Although these changes could be corrected by adjustment of the setpoints of the machine, this requires either operator intervention or reliance on relatively sophisticated electronic process control. In either case, the apparatus is less robust in terms of providing good image quality throughout.

Figure 3:
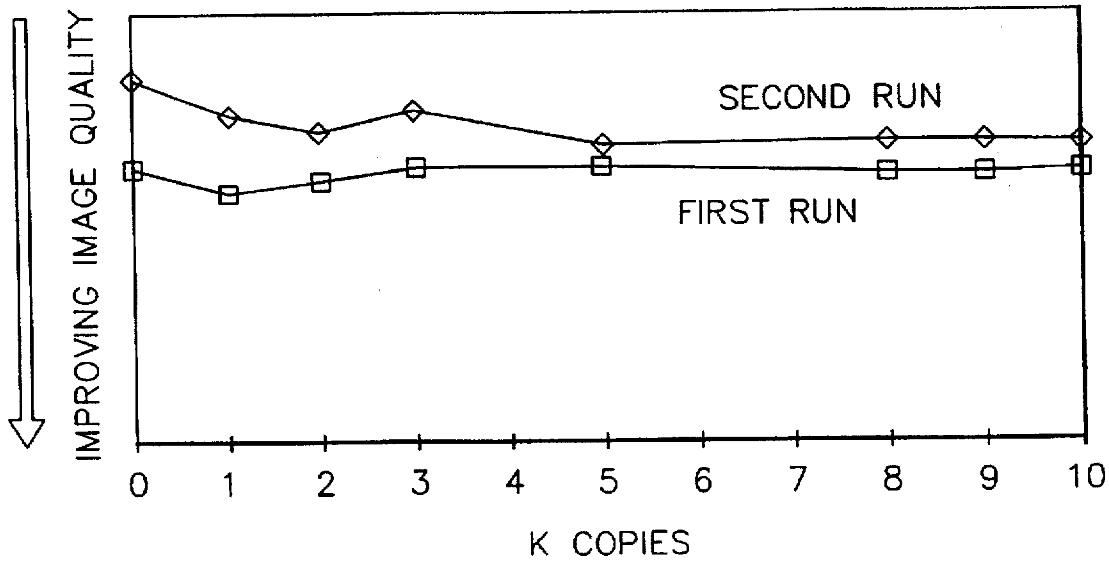
FIG. 3 is a graph of image response against image or copy count (K count) for two different imaging runs.

Using the same materials, two imaging runs were made. In the First Run, the smaller toner was used to start and larger toner used in replenishment. The Second Run used the normal larger replenishment toner to start as well as to replenish. The setpoints were those preferred for the smaller toner. The two runs are shown in FIG. 3 with "Image Response" measured against "K Count." Image response is a conventional, machine measured reading indicative of image quality comparable to the graininess of photographic film. K Count is the number of images or copies in the run. The initially high image response in the first 2000 images in the Second Run is due to excessive mottle caused by larger particles developing out of the developer. The First Run gave good, consistent results throughout. The Second Run eventually provided good results.

The invention has been described in detail with particular reference to a preferred embodiment thereof, but it will be understood that variations and modifications can be effected within the spirit and scope of the invention as described hereinabove and as defined in the appended claims.

We claim:

1. In a method of developing electrostatic images which includes:

providing a fresh mixture of magnetic carrier and toner which toner has a first particle size distribution having a volume weighted mean and the carrier having a coercivity of at least 300 gauss and being coated with an insulative coating, applying toner to the electrostatic images from the mixture as the carrier flips and moves throughh a development zone, the step of applying the toner having a tendency to prefer the application of larger particles of toner over smaller particles from the mixture to the images, thereby reducing the mean particle size of the toner in the mixture, and replenishing the toner used in the method by supplying replenishment toner to the mixture, the improvement comprising replenishing the toner by adding toner having a particle size distribution comparable to that of the toner removed in the toner applying step and having a volume weighted mean larger than the volume weighted mean of the first particle size distribution, to stabilize the particle size distribution of the toner in the mixture at the first particle size distribution.

2. The method according to claim 1 wherein the volume weighted mean particle size of the replenishment toner is between 0.3 and 1.2 microns larger than the mean particle size of the toner in the fresh mixture.

3. A method of developing electrostatic images comprising:

providing a fresh mixture of carrier and toner which toner has a first particle size distribution having a first volume weighted mean, applying toner to the electrostatic images from the mixture, and replenishing the toner used in the method with toner having a second volume weighted mean between 0.3 and 1.2 microns larger than the first volume weighted mean.

4. The method according to claim 3 wherein the carrier is coated with insulative coating and has a coercivity of at least 300 gauss.

5. The method according to claim 4 wherein in the step of applying the carrier flips and moves through a development zone.

6. The method according to claim 5 wherein the carrier is coated with an insulative resin.

7. The method according to claim 3 wherein the carrier has a coercivity of about 2000 gauss.

8. The method according to claim 2 wherein the insulative coating is a resin.

9. The method according to claim 1 wherein the carrier has a coercivity of about 2000 gauss.

10. In a method of depositing a toner onto a member which includes:

providing a mixture of magnetic carrier and toner which toner has a first particle size distribution having a volume weighted mean and the carrier having a coercivity of at least 300 gauss and being coated with an insulative coating, applying toner to the member from the mixture as the carrier flips and moves through a development zone, the step of applying the toner having a tendency to prefer the application of larger particles of toner over smaller particles from the mixture to the member, thereby reducing the mean particle size of the toner in the mixture, and replenishing the toner used in the method by supplying replenishment toner to the mixture, the improvement comprising replenishing the toner by adding toner having a particle size distribution comparable to that of the toner removed in the toner applying step and having a volume weighted mean larger than the volume weighted mean of the first particle size distribution, to stabilize the particle size distribution of the toner in the mixture at the first particle size distribution.

11. The method of claim 10 wherein the first particle size distribution is of a fresh mixture of the magnetic carrier and toner.

12. The method of claim 11 wherein the volume weighted mean particle size of the replenishment toner is between 0.3 and 1.2 microns larger than the mean particle size of the toner in the fresh mixture.

13. The method of claim 12 wherein the carrier has a coercivity of about 2000 gauss.

14. The method of claim 13 wherein the carrier exhibits an induced magnetic moment of at least 20 EMU/gm when in an applied field of 1000 gauss.

15. The method of claim 10 wherein the carrier exhibits an induced magnetic moment of at least 20 EMU/gm when in an applied field of 1000 gauss.

16. For use in the method of claim 12 a replenishment toner for addition to a mixture of magnetic carrier and toner wherein the toner in the mixture has a first particle size distribution having a first volume weighted mean, the replenishment toner having a particle size distribution comparable to that of the toner removed in the toner applying step and having a second volume weighted mean larger than the first volume weighted mean and the second volume weighted mean is between 0.3 and 1.2 microns larger than the first volume weighted mean.

* * * * *

UNITED STATES PATENT AND TRADEMARK OFFICE

CERTIFICATE OF CORRECTION

PATENT NO. : 5,705,307
DATED : Jan. 6, 1998
INVENTOR(S) : Dinesh Tyagi, et al

It is certified that error appears in the above-identified patent and that said Letters Patent is hereby corrected as shown below:

title page, insert --Related U.S. Application Data [60] Provisional Aplication No. 60/002,713, August 23, 1995--

Column 1,line 3, insert
--CROSS REFERENCE TO RELATED APPLICATION, Reference to and priority claimed from U.S. Provisional Application Ser.No. 60/002,713, filed Aug. 23,1995, entitled METHOD OF DEVELOPING ELECTRSTATIC IMAGES.--

Signed and Sealed this

Twenty-fifth Day of May, 1999

*Attest:*

Q. TODD DICKINSON

*Attesting Officer*

*Acting Commissioner of Patents and Trademarks*